Aug. 21, 1928.
J. W. SMITH
1,681,374
GATE
Filed Sept. 25, 1922  4 Sheets-Sheet 1
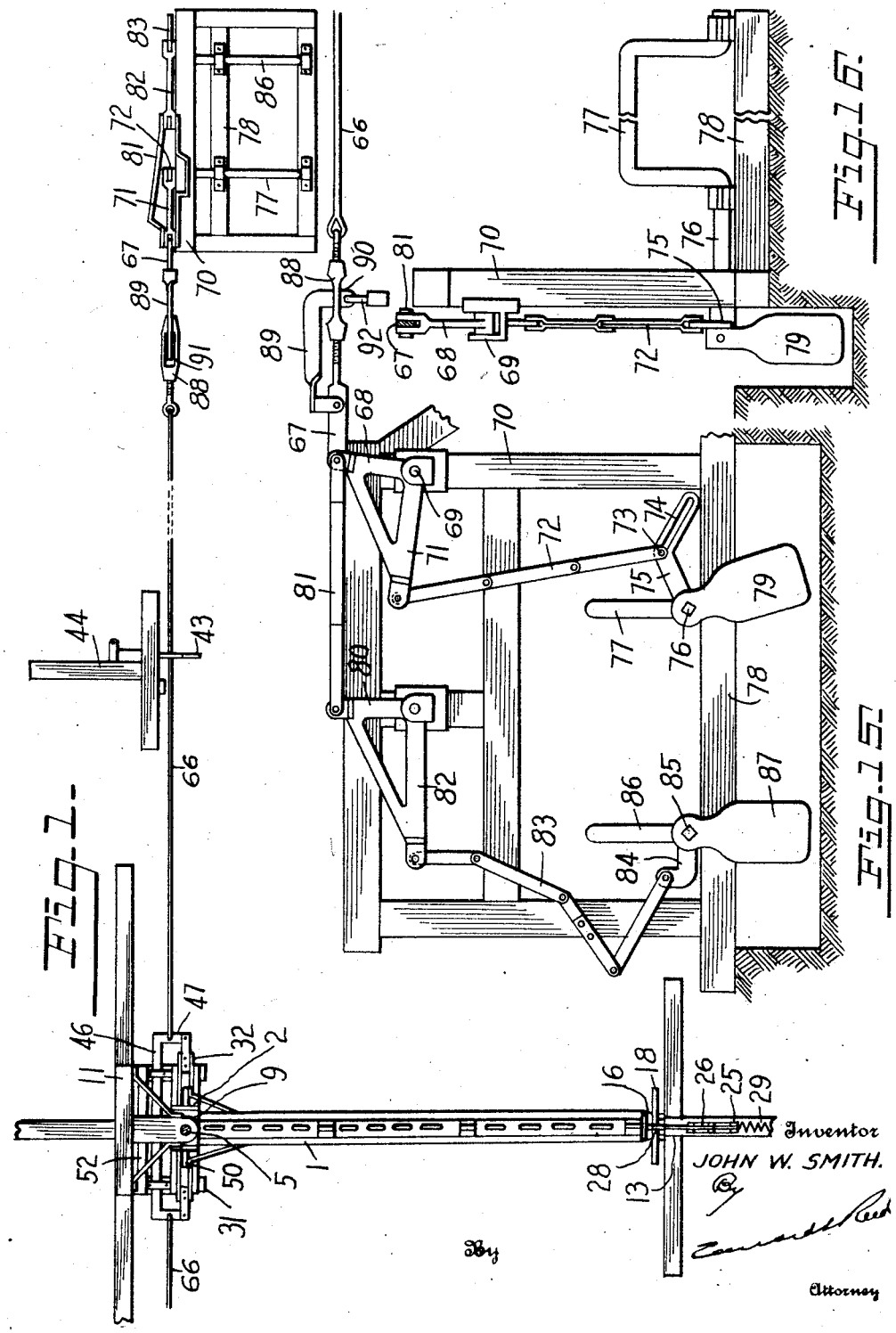

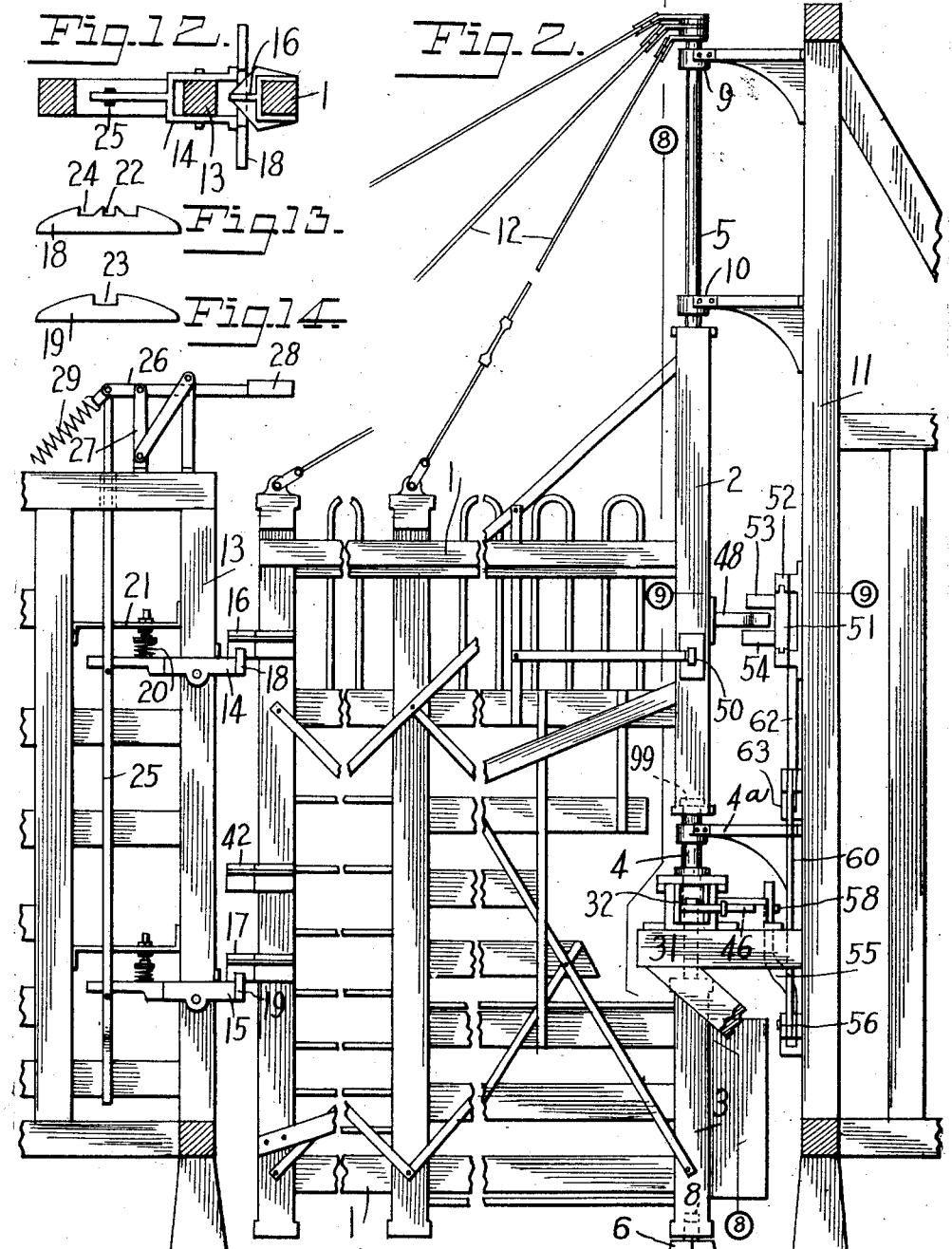

Aug. 21, 1928.  
J. W. SMITH  
GATE  
Filed Sept. 25, 1922   4 Sheets-Sheet 3
1,681,374
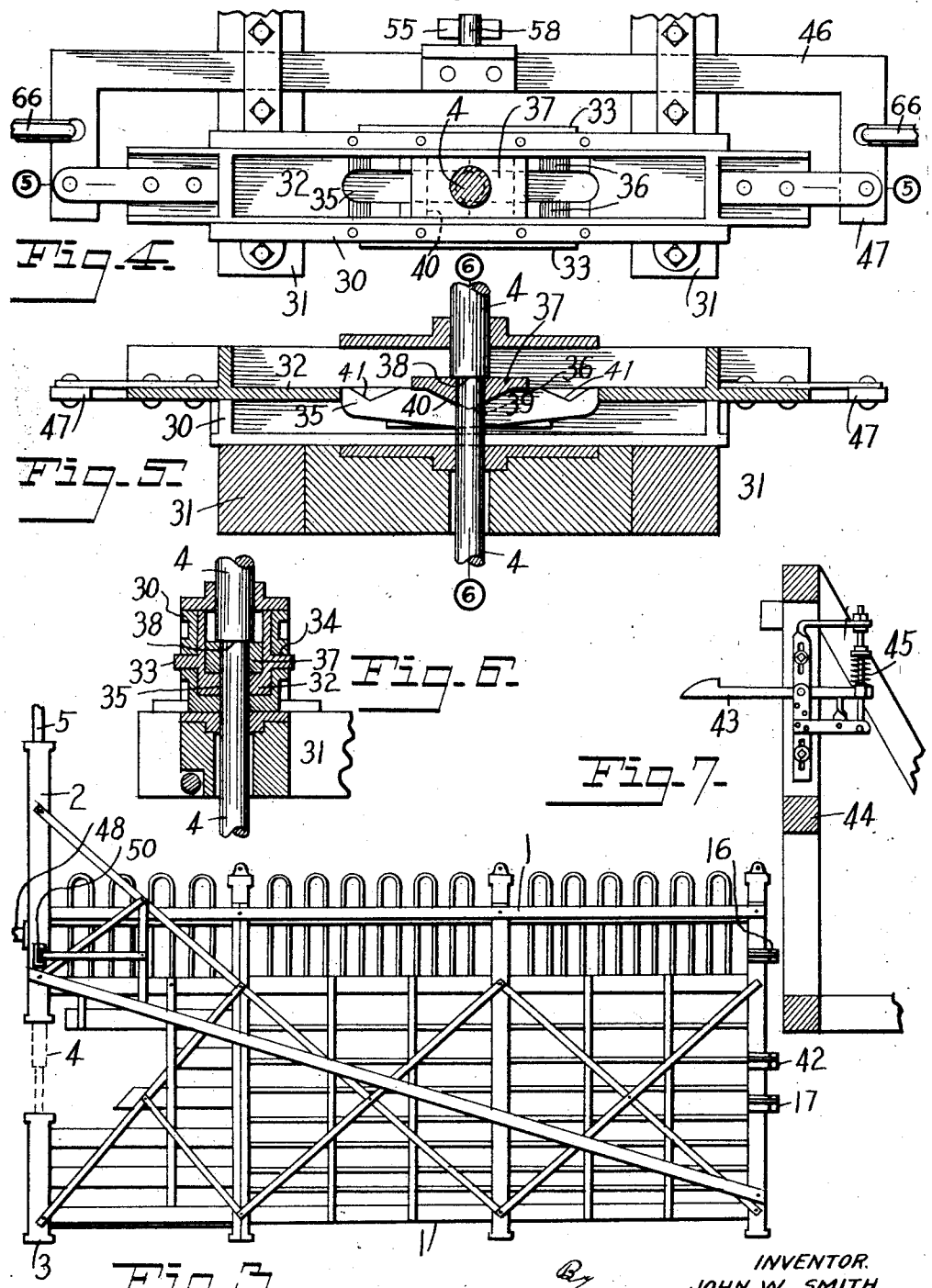
INVENTOR.
JOHN W. SMITH.
Attorney

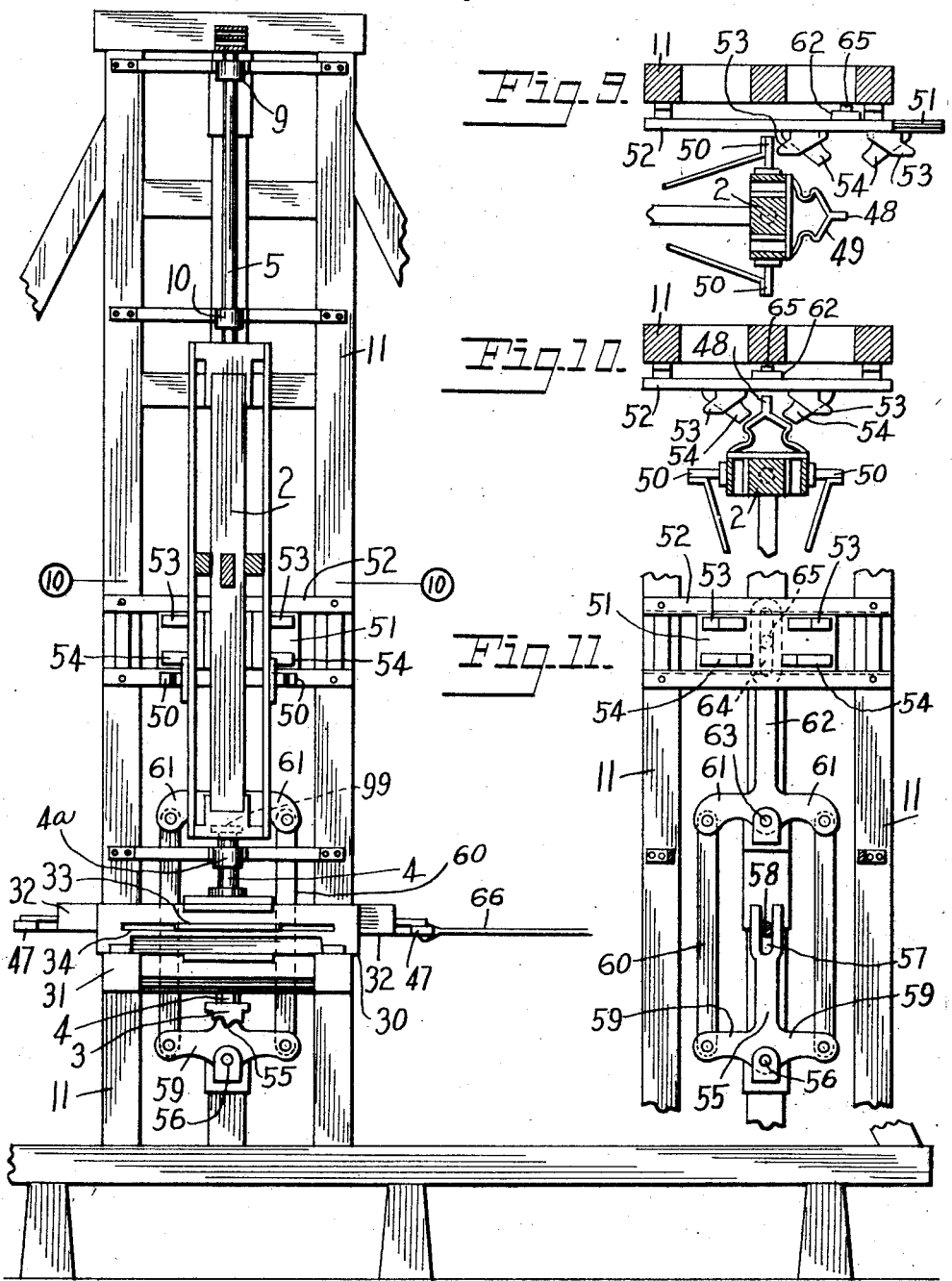

Patented Aug. 21, 1928.

1,681,374

UNITED STATES PATENT OFFICE.

JOHN W. SMITH, OF DAYTON, OHIO.

GATE.

Application filed September 25, 1922. Serial No. 590,346.

This invention relates to gates and more particularly to a gate which is automatically opened and closed by a vehicle passing through the gateway.

One object of the invention is to provide a device of this kind which will operate positively to open and close the gate.

A further object of the invention is to provide a gate of this kind which will be latched in both its closed and open positions and which will be released from the respective latches and moved first to its open position and then to its closed position by the passage of the vehicle.

A further object of the invention is to provide a gate of this kind which will be of a strong durable construction, but which will be simple in its operation and easily operated.

Other objects of the invention will appear as the device is described in detail.

In the accompanying drawings Fig. 1 is a plan view of a gate embodying my invention, showing one of the operating devices; Fig. 2 is a side elevation partly broken away, of such a gate showing the manner of mounting and latching the same; Fig. 3 is a detail elevation of the gate alone; Fig. 4 is a plan view of the lifting device for releasing the gate from the latch; Fig. 5 is a longitudinal sectional view taken on the line 5—5 of Fig. 4; Fig. 6 is a transverse sectional view taken on the line 6—6 of Fig. 5; Fig. 7 is a detail view of one of the latches for retaining the gate in its open position; Fig. 8 is a section taken on the line 8—8 of Fig. 2; Fig. 9 is a section taken on the line 9—9 of Fig. 2, showing the gate in its open position; Fig. 10 is a similar section showing the gate in its closed position; Fig. 11 is a front elevation of the swinging mechanism for opening and closing the gate; Fig. 12 is a top plan view of the upper latch for holding the gate in its closed position; Fig. 13 is a front elevation of the upper latch; Fig. 14 is a front elevation of the lower latch; Fig. 15 is a side elevation of the vehicle actuated operating devices for opening and closing the gate; and Fig. 16 is a front elevation of the opening device.

In these drawings I have illustrated one embodiment of my invention but I wish it to be understood that this particular embodiment has been chosen for the purpose of illustration only and that the gate and its operating devices may take various forms without departing from the spirit of the invention.

As shown in these drawings the gate 1 is carried by a rear standard which forms a part of the gate and supports the gate as a whole, the standard being mounted for rotation about a vertical axis. The standard may be of any suitable form, but in the present instance it is shown as consisting of upper and lower members 2 and 3 connected one to the other by a rod, or shaft 4, the upper member having an extension 5 which, in the present instance, is in the form of a rod, or shaft. The standard is supported at its lower end upon a suitable base 6 which, as here shown, is provided with a vertical stud 7 which is seated in a recess, or bearing, 8 in the lower end of the part 3 of the standard, and forms a trunnion on which the standard moves about a vertical axis. The extension 5 is journaled in suitable bearings formed in brackets 9 and 10 secured to the main supporting structure 11, which constitutes the usual gate post, but does not at all times carry the weight of the gate. This supporting structure may be of any suitable character, but is here shown as a wooden frame properly mounted and braced to give it the strength and rigidity necessary to the support and operation of the gate. A series of brace rods 12 are connected with the upper end of the extension 5 of the standard, above the bearing 9 and are connected with the gate at different distances from the standard to support the same against sagging. It will be noted that these brace rods being rigidly conected with the standard will rotate therewith so they will occupy the same position with relation to the gate during the movements thereof.

The gate is locked normally in its closed position and to this end a second supporting structure, or gate post, 13 is provided with one or more latches, in the present instance, two, 14 and 15, to engage lugs 16 and 17 on the outer, or free, end of the gate. These latches may be of any suitable character but as here shown they comprise levers pivotally mounted between their ends on the structure 13 and provided at those ends adjacent to the gate with latch heads 18 and 19. The latches are yieldably mounted and, as here shown, springs 20 are interposed between those ends of the latches opposite the latch heads and fixed parts of the supporting structure, such as the bars 21. The latch heads 18 and 19 are provided with central notches 22 and 23, respectively, to receive the respective lugs on the gate and the end portions of the upper edges of the latches are inclined in opposite directions from the respective notches so that as the gate moves toward its closed position, from either direction, the lugs 16 and 17 will engage the inclined edges of the latch heads, depress the same and move into the recesses 22 and 23. Preferably the upper latch head 18 is provided with auxiliary recesses 24, on the opposite sides of the central recess 22, to prevent the possibility of the latching lug 16 passing over the recess 22 in case the gate is closed with considerable force. Should the lug pass the central recess it will drop into the auxiliary recess 24 lying beyond the central recess and thus lock the gate. The gate is released from these latches automatically as will be hereinafter described, but I have also provided means whereby the gate may be released manually, thereby enabling it to be opened by hand. To this end I have connected with the latch levers, adjacent to the springs 20, an actuating rod 25, the upper end of which is connected with one end of a lever 26 pivotally mounted on a bracket 27 and having a handle portion 28. If desired, a spring 29 may be connected with the lever 26 to move the rod 25 downwardly, but ordinarily the springs 20 would serve to impart this movement to the rod.

In opening the gate it is first necessary to release the same from the latches and to this end I impart vertical movement to the gate as a whole, the rear standard of the gate being mounted on the supporting structure for vertical movement, as well as for movement about a vertical axis. The lifting device for imparting vertical movement to the gate may take various forms, but I prefer to provide a slidable member which will be operated by suitable vehicle actuated devices to move the gate. As here shown, the lifting device as a whole comprises a guide, or channel bar, 30 rigidly mounted on brackets 31 carried by the supporting structure 11. Slidably mounted in this guideway is the lifting member proper which, preferably, comprises a cam plate 32, having laterally extending lugs, or flanges, 33 which travel in slots 34 in the side walls of the guideway 30, although these lugs, or flanges, are not necessary to the operation of the device. The cam plate 32 is provided with a longitudinal slot 35 through which the rod, or shaft 4 of the standard passes, thereby permitting the cam plate to have reciprocatory movement relatively to the standard. The cam plate is provided on the opposite sides of this notch with cam surfaces, as shown at 36 in Figs. 4 and 5, and these cam surfaces, cooperate with a part 37 mounted on, and held against vertical movement relatively to, the shaft 4. In the present instance, the part 37 is in the form of a plate mounted about the shaft 4 between the upwardly extending flanges on the cam plate 32 which hold it against rotation and having its upper surface in engagement with a shoulder 38 on the shaft. The plate 37 is provided on both sides of the shaft 4 with V-shaped portions 39 which engage the cam surface 36 on the respective sides of the cam plate 32. In the present device each side of the cam plate 32 has a central recess 40 of such a depth that when the plate 37 is seated in the same the gate and the standard will be in their lowermost positions, but when lengthwise movement is imparted to the cam plate in either direction the plate 37 and the standard will be forced upwardly, thus lifting the gate as a whole and disengaging the lugs 16 and 17 from the latches 14 and 15 so that the gate is free to swing to its open position. The cam plate is also provided near its ends with other recesses 41 adapted to receive the V-shaped portion of the plate 37 when the cam plate 32 has completed its movement in either direction, and thus permit the standard and the gate to move downwardly into such a position that a lug on the free end of the gate, in the present instance a third lug, 42, will engage a latch 43 mounted on a suitable structure 44 adjacent to the open position of the gate, there being one of these latches on each side of the gate so that the gate will be locked in its open position when moved in either direction. The latches 43 may be of any suitable character, but as here shown they are in the form of levers pivotally mounted between their ends and each having its rear end acted upon by a spring 45 which tends to hold the nose of the latch in its elevated position, but permits it to be forced downward by the lug 42 and to then spring upward in front of the lug. In the present construction I have shown the recesses 41 in the cam surface of the cam plate 32 as of a less depth than the central recess 40 as this will require less movement of the gate to disengage the same from the latches which retain it in its open position and renders the operation of the gate easy. Longitudinal movement may be imparted to the cam plate 32 in any suitable manner, but in that form of the structure here shown a bar 46 is slidably mounted on the brackets 31 and has laterally extending end portions 47 which are connected with the respective ends of the cam plate. The two ends of the bar 46 are respectively connected with vehicle operated mechanism to be hereinafter described.

After the gate has been released from the latches, in either its closed or open position, swinging movement is automatically imparted thereto and in the present instance this is accomplished by the vehicle operated devices through the same mechanism which actuates the cam plate 32. The standard may rotate as a whole or the upper and lower portions 2 and 3 thereof may rotate on the intermediate shaft 4, this intermediate shaft being mounted in a bearing bracket 4ª. To facilitate the movement of the gate and reduce the friction as far as possible I prefer to provide a rotatable connection between the shaft 4 and the upper member 2 of the standard. In the present instance I have utilized a ball thrust bearing, as shown at 99 Fig. 2 which carries a large part of the weight of the gate and makes it unnecessary for the shaft 4 to rotate on the cam plate 37. As here shown the rear standard of the gate has rigidly secured thereto and projecting rearwardly therefrom, a fixed projection 48 which preferably is provided with inclined shoulders 49 Fig. 9. Extending laterally from the standard at a point slightly below the level of the projection 48 are lateral projections 50 extending on the opposite sides of the standard. Mounted on the supporting structure 11 for movement transversely to the standard 2 is a suitable swinging device having means for engaging the projection 48 when the gate is in its closed position and rocking the standard about its vertical axis. Preferably this swinging device comprises a plate 51 slidably mounted in guide bars 52 secured to the supporting structure 11. Mounted upon this plate are two sets of lugs 53 and 54, the upper lugs 53 cooperating with the projection 48 to open the gate and the lower lugs 54 cooperating with the projections 50 to close the gate. The lugs occupy a fixed vertical position and when the gate is in its lowermost or normal position the projection 48 will lie between the planes of the lugs 53 and 54 but will be moved upwardly into the plane of and between the lugs 53 when vertical movement is imparted to the gate to release it from the latches. While the gate is in its elevated position the plate 51 and lugs 53 are moved transversely to the standard, thus causing one or the other of the lugs 53, depending upon the direction in which the gate is to be opened, to engage the projection 48 and rock the standard about its axis. Preferably the lugs 53 are spaced apart such a distance that they will not engage the projection 48 for some time after the plate 51 has begun to move, thus giving time for the cam plate 32 to lift the standard and properly position the projection 48 with relation to the lugs 53. The lugs 53 are preferably provided with inclined surfaces to engage the inclined surfaces of the projection 48 and thus facilitate the movement of the gate. The lugs will remain in engagement with the projections 48 and positively actuate the gate until a considerable portion of its movement has been accomplished and it has acquired sufficient momentum to cause it to complete its movement and bring the lug 42 into operative engagement with the latch 43. At about the time the projection 48 moves away from the actuating lug 53 the V-shaped portion of the plate 37 will move into one of the shallow end recesses of the cam plate 32, thus permitting the gate to move downwardly so that the lug 42 will occupy its proper position with relation to the latch 43 and this movement of the V-shaped plate on the inclined wall of the cam also assists in the movement of the gate about its vertical axis. When the gate is to be closed the plate 51 of the swinging device is moved in the opposite direction and it will be noted, by reference to Fig. 9, that one of the lateral projections 50 on the standard will lie in the path of the adjacent lower lug 54 and will be engaged by that lug and the gate moved about its vertical axis toward its closed position. Before this takes place, however, the cam plate 32 has moved far enough to again lift the gate so as to free the same from the latch 43, and to position the projection 50.

As has been stated, movement is preferably imparted to the swinging device from the vehicle actuated devices through the same device which actuates the cam plate and to this end I have mounted on the supporting structure 11 a vertical rock arm 55 which is pivotally mounted near its lower end at 56 and provided at its upper end with a slot 57 which receives a pin 58 rigidly secured to and extending rearwardly from the actuating bar 46 for the cam plate 32. Near its lower end the rock arm 55 is provided with laterally extending arms 59 which are connected by links 60 with laterally extending arms 61 rigidly secured to a second rock arm 62 also arranged vertically and pivoted on the supporting structure near its lower end at 63. This second rock arm 62 has its upper end slotted, as shown at 64, to receive a pin 65 extending rearwardly from the plate 51 of the swinging device. It will be apparent, therefore, that when the actuating bar 46 is moved in either direction the rock arm 55 will be actuated and its movement will be transmitted to the rock arm 62 which in turn will actuate the plate 51 which imparts the swinging movement to the gate.

The vehicle actuated devices may be of any suitable character and may be connected with the lifting and swinging mechanism in any suitable manner, but, in the present instance, I have connected with each arm 47 of the actuating bar 46, a connecting member, preferably a cable 66, and each of these cables extends to a point remote from the gate, but adjacent to the path of travel of a vehicle which is to pass through the gateway, and is there connected with suitable vehicle actuating devices for opening and closing the gate. It will be obvious that vehicle actuated devices are arranged on both sides of the gate and that the gate closing device on one side of the gate will be operated to close the gate after the gate opening device on the other side of the gate has been operated to open the same. In the present drawings I have shown one pair of vehicle operated devices which will be sufficient to enable their operation to be understood. As shown in Figs. 1, 15 and 16, the cable 66 is connected with a bar 67 with which is connected the arm 68 of a bell crank lever pivotally mounted at 69 on a suitable supporting structure 70. The other arm 71 of the bell crank has pivotally connected therewith one end of a connecting member 72 which is preferably flexible in character and is here shown as made up of a series of links pivotally connected one to the other. The lower end of this connecting member is provided with a part, such as a pin 73, which extends into a slot 74 in a rock arm 75, which is rigidly secured to the horizontal portion or shaft 76 of a vehicle operated device, which, as here shown, is in the form of a crank, or loop, journaled on a suitable base 78 and extending upwardly therefrom, a counter balancing weight 79 being preferably attached to the shaft 76 to hold the crank 77 in upright position. Also mounted on the supporting structure 70 is a second bell crank lever, one arm 80 of which is connected by a link 81 with the bar 67 and arm 68 of the first mentioned bell crank lever. The second arm 82 of this second bell crank lever is connected by a flexible connecting member 83, also preferably formed of links with a rock arm rigidly secured to the shaft 85 of a second vehicle operated member, or crank, 86 which is also counter balanced by a weight 87. The arrangement of the vehicle actuated member, or crank, 77 is such that when a vehicle which has passed through the gateway engages the same it will move idly into its lower position to permit the passage of the vehicle, the pin 73 travelling in the slot 74 of the rock arm 75, but when a vehicle approaching the gate engages this crank the connecting member 72 will be actuated to rock the bell crank lever 68—71, and thus, through the cable 66, actuate the bar 46 which in turn actuates the lifting and swinging devices, thus causing the gate to be opened and latched in its open position. The vehicle, before passing over the member 77 will engage the second, or closing, crank 86 but this crank is normally free to swing idly in either direction, and consequently will yield to permit the passage of the vehicle without affecting the mechanism. After the vehicle has passed through the gate it will first engage the other opening device, or crank, 77 and move the same idly in a reverse direction, but the movement of the actuating bar 46 has been transmitted through the second cable 66 to the bell crank lever 80—82 of the closing device and has caused this lever to be moved about its axis to such an extent that the slack is taken out of the flexible member 83 and a taut connection established between the same and the closed member, or crank, 86. Consequently, when the vehicle engages this closing link, on the far side of the gate, the bell crank lever 80—82 will be moved downwardly, thus actuating the bar 46 in a reverse direction and causing the gate to be released and closed.

The tension of the connecting member, or cable, 66 may be adjusted by means of a turn buckle 88 and in order to prevent the accidental or unauthorized movement of this turn buckle, I have provided a locking device consisting of an arm 89 pivotally mounted on the bar 67 and having a down-turned end portion 90 which extends through a slot 91 in the turn buckle and thus prevents it from rotating. The locking arm may be locked in its lower position in any suitable manner, as by means of a pad lock 92.

The operation of the gate will be readily understood from the foregoing description and it will be apparent that I have provided a very strong, durable gate which will be positively actuated by the vehicle to automatically release it from its latch and move it to an open position, in which it will be latched, and to then release it from the second latch and move it to its closed position. The operation is simple and is easily accomplished, the leverage being such that a vehicle of light weight will operate a very heavy gate.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. The combination with a swinging gate and a latch to hold the same normally against movement, said gate being mounted for bodily vertical movement to disengage it from said latch, of a reciprocatory device to impart vertical movement to said gate, vehicle operated means connected with said device, an oscillatory device operatively connected with the first mentioned device, and a reciprocatory device actuated by said oscillatory device to impart swinging movement to said gate.

2. The combination with a swinging gate and a latch to hold the same normally against movement, said gate being mounted for bodily vertical movement to disengage it from said latch, of a reciprocatory member having a cam surface to impart vertical movement to said gate, and vehicle actuated means to operate said reciprocatory member.

3. The combination with a swinging gate and a latch to hold the same normally against movement, said gate being mounted for bodily vertical movement to disengage it from said latch, of a lifting device to impart vertical movement to said gate, a reciprocatory device to impart swinging movement to said gate, and vehicle actuated means to operate both said devices.

4. The combination with a swinging gate and a latch to hold the same normally against movement, said gate being mounted for bodily vertical movement to disengage it from said latch, of a reciprocatory member having a cam surface to impart vertical movement to said gate, a reciprocatory device to impart swinging movement to said gate, and vehicle actuated means connected with both said reciprocatory devices to first lift said gate and then swing the same.

5. In combination with a gate comprising a standard which supports said gate as a whole and is movable about a vertical axis, and a latch to hold said gate normally against movement about said axis, said standard being mounted for vertical movement to lift said gate out of engagement with said latch, of a device acting on said standard to impart vertical movement to said gate, a second device acting on said standard to impart swinging movement to said gate, an operative connection between said devices, and vehicle operated means connected with one of said devices.

6. The combination with a gate comprising a standard which supports said gate as a whole and is movable about a vertical axis, and a latch to hold said gate normally against movement about said axis, said standard being mounted for vertical movement to lift said gate out of engagement with said latch, of a longitudinally movable member having a cam surface, a part connected with said standard and adapted to engage said cam surface, and vehicle actuated means for operating said longitudinally movable member.

7. The combination with a gate comprising a standard which supports said gate as a whole and is movable about a vertical axis, and a latch to hold said gate normally against movement about said axis, said standard being mounted for vertical movement to lift said gate out of engagement with said latch, of a slidable member mounted adjacent to said standard and having a cam surface on the upper face thereof, a part mounted on said standard and adapted to engage the cam surface of said slidable member, said part being held against vertical movement relatively to said standard and against rotation with said standard, and vehicle operated means for imparting sliding movement to said slidable member.

8. The combination with a gate comprising a standard which supports said gate as a whole and is movable about a vertical axis, and a latch to hold said gate normally against movement about said axis, said standard being mounted for vertical movement to lift said gate out of engagement with said latch, of a guideway extending transversely of said standard, a cam plate slidably mounted in said guideway, and having an intermediate recess in the upper surface thereof, a part mounted about said standard, held against vertical movement relatively thereto, and adapted to enter the recess in said cam plate, and vehicle operated means for moving said cam plate in either direction in said guideway.

9. The combination with a gate comprising a standard which supports said gate as a whole and is movable about a vertical axis, and a latch to hold said gate normally against movement about said axis, said standard being mounted for vertical movement to lift said gate out of engagement with said latch, of a slidable member for lifting said standard, an actuating bar extending parallel with the line of movement of said lifting member and connected therewith, vehicle actuated devices, and an operative connection between said vehicle actuated devices and said actuating bar.

10. The combination with a gate comprising a standard which supports said gate as a whole and is movable about a vertical axis, and a latch to hold said gate normally against movement about said axis, said standard being mounted for vertical movement to lift said gate out of engagement with said latch, of a slidable member to impart vertical movement to said standard, a second slidable member moving transversely to said standard, means for establishing an operative connection between said second slidable member and said standard to cause the latter to be moved about its vertical axis, vehicle actuated devices, and means for operatively connecting both of said slidable members with said vehicle actuated devices.

11. The combination with a gate comprising a standard which supports said gate as a whole and is movable about a vertical axis, and a latch to hold said gate normally against movement about said axis, said standard being mounted for vertical movement to lift said gate out of engagement with said latch, of a slidable member having means for imparting lifting movement to said standard, an actuating bar extending parallel with the line of movement of said slidable member and operatively connected therewith, a second slidable member, means for establishing an operative connection between said second slidable member and said standard to rotate the latter about its vertical axis, an operative connection between said second slidable member and said actuating bar, and vehicle actuated devices operatively connected with said actuating bar.

12. The combination with a gate comprising a standard supporting said gate and mounted for movement about a vertical axis, and a projection carried by said standard, of a device mounted for movement transversely to said standard, and parts carried by said device and arranged normally on the opposite sides of the vertical plane of the projection on said standard, and vehicle operated means for actuating said device.

13. The combination with a gate comprising a standard supporting said gate and mounted for movement about a vertical axis, a rearwardly extending projection carried by said standard, and two laterally extending projections carried by said standard, of a device mounted for movement transversely to said standard and having a lug to engage the first mentioned projection to open said gate, and having other lugs to engage the last mentioned projections to close said gate.

14. The combination with a gate comprising a standard which supports said gate as a whole and which is movable about a vertical axis, and a latch to hold said gate normally against movement about said axis, said standard being mounted for vertical movement to lift said gate out of engagement with said latch, of a lifting device to impart vertical movement to said standard and said gate, a gate swinging device movable transversely to said standard and having lugs projecting therefrom toward said standard and spaced apart, and a projection carried by said standard and arranged normally below the horizontal plane of said lugs and adapted to be moved by the vertical movement of said standard into the space between said lugs, whereby the movement of said lugs in either direction will impart swinging movement to said gate.

15. The combination with a gate comprising a standard which supports said gate as a whole and which is movable about a vertical axis, and a latch to hold said gate normally against movement about said axis, said standard being mounted for vertical movement to lift said gate out of engagement with said latch, of a lifting device to impart vertical movement to said standard and said gate, a gate swinging device movable transversely to said standard and having lugs projecting therefrom toward said standard and spaced apart, and a projection carried by said standard and arranged normally below the horizontal plane of said lugs and adapted to be moved by the vertical movement of said standard into the space between said lugs, whereby the movement of said lugs in either direction will impart swinging movement to said gate, projections extending laterally from the opposite sides of said standard, and other lugs carried by said swinging device and arranged respectively to engage the last mentioned projections on said standard when said gate is in one or the other of its open positions.

16. The combination with a gate comprising a standard which supports said gate as a whole and which is movable about a vertical axis, and a latch to hold said gate normally against movement about said axis, said standard being mounted for vertical movement to lift said gate out of engagement with said latch, of a lifting device for imparting vertical movement to said standard, a gate swinging device for rotating said standard about its vertical axis, a rock arm connected with said lifting device, a second rock arm connected with said swinging device, an operative connection between said rocks arms, and vehicle actuated means for imparting movement to said lifting device.

17. The combination with a gate comprising a standard which supports said gate as a whole and which is movable about a vertical axis, and a latch to hold said gate normally against movement about said axis, said standard being mounted for vertical movement to lift said gate out of engagement with said latch, of a lifting member to impart vertical movement to said standard, an actuating device operatively connected with said lifting member, a gate swinging device to move said standard about its vertical axis, a rock arm pivotally supported at one end and operatively connected at its other end with said swinging device, a second rock arm pivotally supported at one end and operatively connected at its other end with said actuating device, each of said rock arms having laterally extending arms, links connecting the respective laterally extending arms, and vehicle actuated devices for imparting movement to said actuating device.

18. The combination with a gate comprising a standard which supports said gate as a whole and which is movable about a vertical axis, and a latch to hold said gate normally against movement about said axis, said standard being mounted for vertical movement to move said gate out of engagement with said latch, of a lifting cam for said standard having a central recess, and other recesses on the opposite sides of said central recess, a part connected with said standard, engaging said cam and adapted to enter any one of said recesses, an actuating device for said cam, vehicle actuated devices operatively connected with said actuating device, a gate swinging device comprising a member movable transversely to said standard and having two pairs of lugs, arranged in different horizontal planes, a projection extending rearwardly from said standard and arranged normally below one pair of said lugs and adapted to be moved into the space between the lugs of said pair when vertical movement is imparted to said standard, other projections extending from the opposite sides of said standard and so arranged that when said gate is open one of said last mentioned projections will lie adjacent to one of the lugs of the other pair and will be moved into the path of said lug when vertical movement is imparted to said standard by said cam.

19. The combination with a swinging gate, means for holding said gate normally against movement, and means to release said gate and impart movement thereto, of a lever mounted on a fixed axis at a point remote from said gate and operatively connected with said releasing and swinging means, a vehicle actuated device supported normally in a position to be actuated by a vehicle moving in either direction, and a connection between said vehicle actuated device and said lever, said connection comprising means for rendering the same operative when said vehicle actuated device is moved in one direction and to render the same inoperative when said vehicle actuated device is moved in the other direction.

20. The combination with a swinging gate, means for holding said gate normally against movement, and means to release said gate and impart swinging movement thereto, of an actuating lever mounted at a point remote from said gate and operatively connected with said releasing and swinging means, a vehicle actuated device supported normally in a position to be actuated by a vehicle moving in either direction, a rock arm comprising a part connected with said vehicle actuated device and a second part extending at an angle to the first mentioned part and having a longitudinal slot therein, and a connecting member attached to said lever and having a part slidably mounted in the slot in the last mentioned part of said rock arm.

21. The combination with a swinging gate, latches for holding said gate in its closed and open positions, and an actuating device so arranged that when moved in one direction it will release said gate and move it toward its open position and when moved in the other direction will release said gate and move it toward its closed position, of a vehicle operated device on one side of said gate to impart the first mentioned movement to said actuating device, a second vehicle operated device on the other side of said gate to impart the last mentioned movement to said actuating device, said second vehicle operated device being supported normally in an upright position and having a normally inoperative connection with said actuating device, and means actuated by the first mentioned vehicle operated device to render the connection between said second vehicle operated device and said actuating device operative.

22. The combination with a swinging gate, latches for holding said gate in its open and closed positions, and an actuating device so arranged that when moved in one direction it will release said gate and move it toward its open position and when moved in the other direction will release said gate and move it toward its closed position, of a vehicle operated device on one side of said gate to impart the first mentioned movement to said actuating device, a second vehicle operated device on the other side of said gate supported normally in a position to be actuated by a vehicle, a lever mounted adjacent to said second vehicle operated device, a connection between said second lever and said actuating device, and a normally slack connection between said lever and said second vehicle operated device, the last mentioned connection being so arranged that it will be rendered taut when movement is imparted to said lever by the movement of said actuating device by the first mentioned vehicle operated device.

23. The combination with a swinging gate, latches for holding said gate in its closed and open positions, and an actuating device so arranged that when moved in one direction it will release said gate and move it toward its open position and when moved in the other direction will release said gate and move it toward its closed position, of vehicle operated mechanisms arranged on the respective sides of said gate, connecting members extending from said actuating device to the respective vehicle operated mechanisms, each of said mechanisms comprising two bell crank levers operatively connected with the respective connecting members, two vehicle operated members arranged one beyond the other in the path of the vehicle and supported normally in positions to be actuated by a vehicle moving in either direction, and operative connections between said vehicle operated members and the respective bell crank levers, one of said connections being normally inoperative.

24. The combination with a swinging gate, latches for holding said gate in its closed and open positions, and an actuating device so arranged that when moved in one direction it will release said gate and move it toward its open position and when moved in the other direction will release said gate and move it toward its closed position, of vehicle operated mechanisms arranged on the respective sides of said gate, connecting members extending from said actuating device to the respective vehicle operated mechanisms, each of said mechanisms comprising two bell crank levers operatively connected with the respective connecting members, two vehicle operated members arranged one beyond the other in the path of the vehicle, and operative connections between said vehicle operated members and the respective bell crank levers, one of said connections being normally inoperative, and the other of said vehicle operated members being normally inoperative when moved in one direction and normally operative when moved in the other direction.

25. The combination with a swinging gate, of an actuating device for moving said gate in either direction, of a vehicle operated mechanism arranged on each side of said gate, each of said mechanisms comprising two vehicle operated members arranged one beyond the other in the path of the vehicle, each of said vehicle operated members being connected with said actuating device, one of said connections being normally inoperative and the other of said connections being normally operative when the vehicle operated member is moved in one direction and normally inoperative when said member is moved in the other direction.

26. The combination with a swinging gate, of an actuating device for moving said gate in either direction, of a vehicle operated mechanism arranged on each side of said gate, each of said mechanisms comprising two normally upright vehicle operated members arranged one beyond the other in the path of the vehicle, counter weights to hold said members normally in their upright positions, connections between both vehicle operated members and said actuating device, one of said upright members being normally free to swing in either direction and the other of said upright members being normally free to swing in one direction only, its movement in the other direction causing the operation of said actuating device.

27. The combination with a swinging gate, of an actuating device for moving said gate in either direction, of a vehicle operated mechanism arranged on each side of said gate, each of said mechanisms comprising two normally upright vehicle operated members arranged one beyond the other in the path of the vehicle, counter weights to hold said members normally in their upright positions, connections between both vehicle operating members and said actuating device, one of said upright members being normally free to swing in either direction and the other of said upright members being normally free to swing in one direction only, its movement in the other direction causing the operation of said actuating device, the movement of said actuating device by the last mentioned upright member on one side of said gate serving to establish an operative connection between said actuating device and a normally inoperative upright member on the other side of said gate, whereby the movement of said last mentioned upright member in one direction will operate said actuating member.

28. The combination with a swinging gate, of an actuating device for moving said gate in either direction, of vehicle actuated mechanism, a flexible connection between said actuating device and said vehicle actuating mechanism, means for adjusting said connection, and means for locking said adjusting means against movement.

29. The combination with a swinging gate and a latch to hold said gate normally against movement, said gate being mounted for vertical movement to disengage it from said latch, of a supporting structure mounted adjacent to the axis about which said gate swings, two actuating members mounted on said supporting structure for bodily movement transversely thereto, means actuated by the respective members for lifting and swinging said gate, a connection between said actuating members to cause one of them to be operated by the other, and a vehicle operated device connected with one of said members.

30. The combination with a swinging gate, and a latch to hold said gate normally against movement, said gate being mounted for vertical movement to disengage it from said latch, of a supporting structure mounted adjacent to the axis about which said gate swings, two actuating members mounted on said supporting structures for bodily movement transversely thereto, means actuated by the respective members for lifting and swinging said gate, lever mechanism mounted on said supporting structure and operatively connected with said actuating members to cause the movement of one of said members to be transmitted to the other of said members, and a vehicle actuated device connected with one of said actuating members.

31. The combination with a swinging gate and a latch to hold said gate normally against movement, said gate being mounted for vertical movement to disengage it from said latch, of a supporting structure mounted adjacent to the axis about which said gate swings, an actuating member mounted on said supporting structure for bodily movement transversely thereto, means actuated by said member for lifting said gate, a vehicle operated device connected with said actuating member, a lever mounted on said supporting structure, an operative connection between said actuating member and said lever, a second actuating member mounted on said structure, means actuated by said second member to swing said gate, and an operative connection between said lever and said second actuating device.

In testimony whereof, I affix my signature hereto.

JOHN W. SMITH.